UNITED STATES PATENT OFFICE.

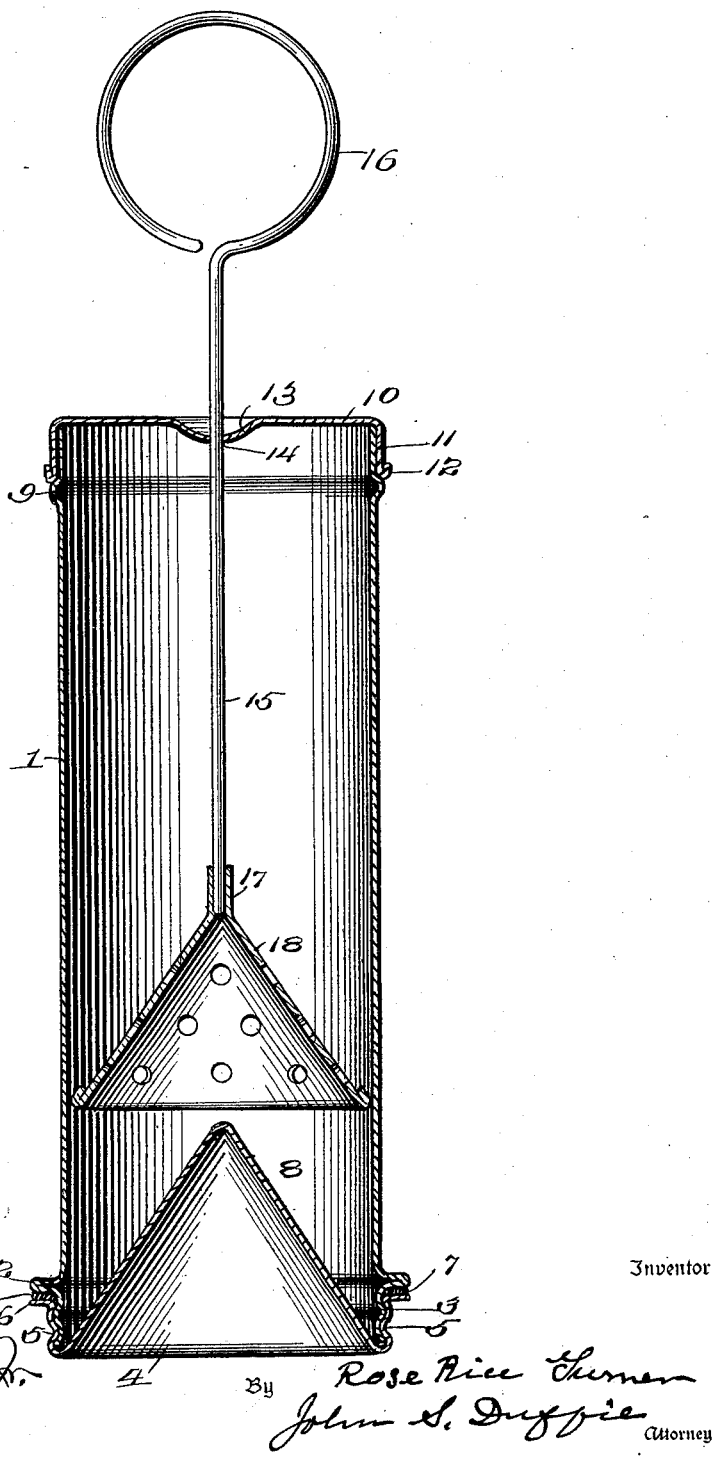

ROSE RICE TURNER, OF SPOKANE, WASHINGTON, ASSIGNOR TO EDNA RICE PRATHER, OF SPOKANE, WASHINGTON.

EGG-BEATER.

1,030,796.  Specification of Letters Patent.  Patented June 25, 1912.

Application filed January 31, 1912. Serial No. 674,449.

*To all whom it may concern:*

Be it known that I, ROSE RICE TURNER, a citizen of the United States, residing at Spokane, in the county of Spokane and State of Washington, have invented certain new and useful Improvements in Egg-Beaters, of which the following is a specification.

My invention relates to new and useful improvements in egg beaters, cream whippers, ice cream freezers, etc., and consists in a body preferably cylindrical in shape, which body is considerably taller than wide, a lid perforated and depressed at its center having a rim adapted to neatly fit the upper end of said body, a cup having a conical bottom and adapted to screw onto the lower end of said body, a perforated conical shaped dasher, a stem secured to said dasher, passing through said perforation and provided with a handle.

Referring to the accompanying one sheet of drawing, which illustrates my invention, and in which similar numerals of reference in the drawing and specification indicate like parts, in which the figure is a central, vertical view of my invention.

Referring more particularly to the drawing my invention is described as follows: The numeral 1 indicates the body of my invention which may be of any desired shape but is preferably cylindrical, near the lower end of said body is a circular flange 2, all the way around said body, the part of the body below said flange is pressed into a screw thread 3, a cup 4 is provided with a screw thread 5 adapted to screw on and closely fit the said thread 3, and the upper part of said thread is turned out forming a flange 6, and fitted between the two flanges 2 and 6 is a washer 7, this washer may be made of rubber, cork or other elastic material, the bottom 8 of said cup is cone shaped and turns up into the inside of said body, said body is provided near its top end with a bead 9 and fitting on the said top end is a cap 10, the lower edge of its flange 11 being provided with a strengthening rim 12 which fits down closely against said head 9 and prevents leakage at that point, while the two flanges 2 and 6 near the lower end of the body compress the washer 7 and prevent leakage at that point, the said cap 10 is provided in its center with a depression 13 and a perforation 14. The said depression and perforation are for the purpose of drainage. Passing down through said perforation is a rod 15, the upper end of which is provided with a handle 16 and the lower end of said rod is secured to the apex 17 of a perforated cone shaped dasher 18, this dasher is designed to and is so constructed that it fits down over the cone shaped bottom 8 of the cup.

As the perforated cone shaped dasher is pressed down the contents of the vessel is forced upwardly and outwardly through the perforations therein and against the wall of the body of the vessel, thus thoroughly cutting up the contents thereof and keeping it agitated and forcing it alternately against the cone-shaped bottom and the wall of the body. By setting this vessel in a tub of cracked ice so that the cone shaped bottom will be filled with ice as well as the body surrounded therewith, it makes a most excellent freezer.

I am aware that there have been other beaters and freezers constructed somewhat like my invention, but in every instance the bottom was integral with the lower end of the body and therefore it was very difficult and almost impossible to clean the inside of the vessel and one of the purposes of this invention is to overcome this difficulty by making the bottom removable, as shown in the drawings and described in this specification.

Having described my invention, what I claim as new and desire to secure by Letters Patent, is:

A vessel of the nature described consisting of a body, preferably cylindrical in shape having near its upper end a bead; a cap provided with a central depression and a perforation through said depression, said cap adapted to fit closely on the upper end of said body, its flange part fitting closely down on said bead; a rod provided with a handle working up and down through said perforation, a perforated cone-shaped dasher secured at its apex to the lower end of said rod; a flange integral with and extending outwardly from near the lower end of said body; a screw-thread extending from the lower end of said body; a flexible washer encircling the lower end of said body and fitting up against said flange, a cup having a flange corresponding with the flange just mentioned and adapted to fit up against the lower face of said washer, and a thread integral with the lower end of said cup and adapted to screw into the thread just mentioned, and press said washer against the flange of said body, substantially as shown and described and for the purposes set forth.

In testimony whereof I affix my signature in presence of two witnesses.

ROSE RICE TURNER.

Witnesses:
MARY PRATHER,
ROSE JUDSON.

Copies of this patent may be obtained for five cents each, by addressing the "Commissioner of Patents, Washington, D. C."